United States Patent [19]

Hopper

[11] Patent Number: 4,920,811
[45] Date of Patent: May 1, 1990

[54] FAIL-SAFE RELEASE ACTUATOR MECHANISM

[75] Inventor: Hans P. Hopper, Aberdeen, Scotland

[73] Assignee: The British Petroleum Company p.l.c., London, England

[21] Appl. No.: 320,332

[22] Filed: Mar. 7, 1989

[30] Foreign Application Priority Data

Mar. 10, 1988 [GB] United Kingdom ............... 8805744

[51] Int. Cl.$^5$ ...................... G05G 17/00; F16H 25/20; F16K 31/02
[52] U.S. Cl. ........................................ 74/2; 74/89.15; 74/424.8 VA; 74/625; 251/69; 251/71; 251/129.11; 475/4; 475/178
[58] Field of Search ............... 74/2, 89.15, 424.8 R, 74/424.8 VA, 625, 804, 805; 251/59, 71, 129.11

[56] References Cited

U.S. PATENT DOCUMENTS

| | | | |
|---|---|---|---|
| 301,096 | 7/1884 | Clemons | 74/804 |
| 3,113,473 | 12/1963 | Morlen | 74/2 X |
| 3,255,636 | 6/1966 | Wehrli | 251/69 X |
| 3,279,744 | 10/1966 | Fieldsen et al. | 251/71 X |
| 3,324,741 | 6/1967 | Anderson | 251/71 X |
| 3,640,140 | 2/1972 | Gulick et al. | 251/71 X |

FOREIGN PATENT DOCUMENTS

2202561 9/1988 United Kingdom.

Primary Examiner—Allan D. Herrmann
Attorney, Agent, or Firm—D. P. Yusko; D. J. Untener; L. W. Evans

[57] ABSTRACT

A mechanical actuator for moving a shaft axially has a motor driving a gear assembly giving a mechanical advantage of at least 30:1, preferably 50 to 150:1. The assembly drives an internally screw threaded sleeve on external screw threads of the shaft so that rotation of the sleeve moves the shaft axially. A stop connected to a gear of the gear assembly for the sleeve ensures that it is the shaft that moves.

The actuator is suitable for all valves, chokes and control mechanisms for oil or gas production, particularly sub-sea production and the motor is preferably a reversible DC electric motor. The mechanical advantage allows heavily loaded shafts to be moved with low power input.

When applied to spring loaded fail-safe valves the stop for the sleeve may be one or more moveable locking dogs actuated by the gear assembly. The gear assembly acts as a differential transmitting torque either to the gear wheel actuating the stop of the gear wheel rotating the sleeve.

10 Claims, 6 Drawing Sheets

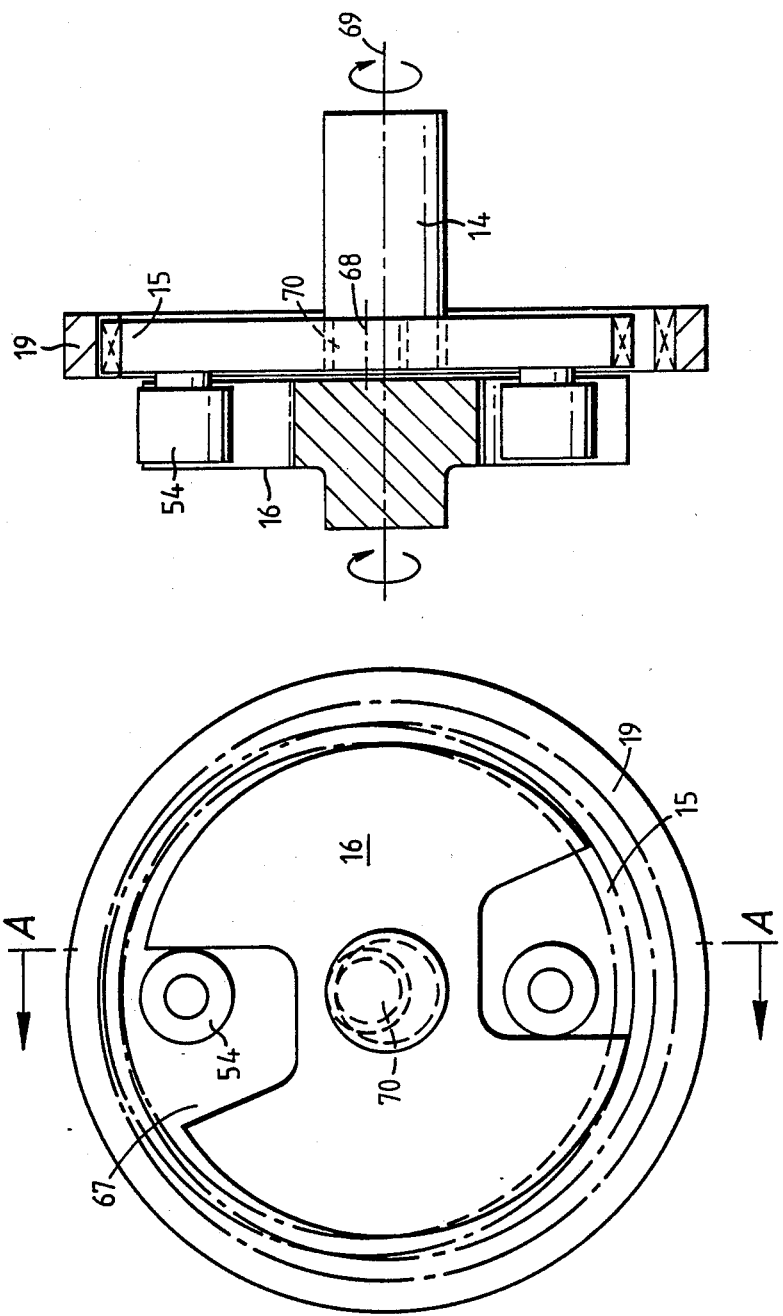

FAIL-SAFE RELEASE ACTUATOR MECHANISM

BACKGROUND OF THE INVENTION

1. Field of the Invention

This invention relates to an actuator for moving a shaft axially against a high load force, the actuator being powered by a relatively low power motor. It can be used to move any shaft in any situation, but is particularly suitable for moving valves, chokes or other control mechanisms used in e.g. oil or gas production or process plant.

The invention relates particularly to actuators for valves used in remote or inaccessible locations, e.g. sub-sea valves of a sub-sea oil or gas production complex. It will be described with reference to such a sub-sea location, but it is to be understood that it could be used in any terrestrial or aquatic location.

2. DESCRIPTION OF RELATED ART

Currently sub-sea valves are operated by hydraulics or electro-hydraulics. Some valves have a safety system so that they fail-safe if there is any loss of power. They may fail-safe closed or open depending on the valve. A common fail-safe system is one or open valve has a spring tending to move it to a closed (or open) position and a powered actuator acting against the spring. If there is any loss of power, the spring automatically moves the valve to its fail-safe position.

Direct hydraulics for powering the valve actuators are suitable and are extensively used for sub-sea units within a reasonable distance of a surface operating installation. There is a considerable response time for direct hydraulics, and electro-hydraulics more suitable for sub-sea units at any distance from the operating installation. Electric power and signals are transmitted to electrical solenoids which operate hydraulic control valves having a hydraulic fluid supply system at the sub-sea unit. A considerable volume of fluid is required, and, for faster operations, storage accumulators are necessary. Either closed or open hydraulic systems can be used, with failure of the electrical or hydraulic systems allowing the loss of venting off of the hydraulic fluid and allowing the valve to move to the fail-safe position.

The use of hydraulics has the following drawbacks:

there is a time lag between the command given at an operating installation and the actuation, this time lag increasing as the distance from the operating installation increases, it creates high pressure circuits involving numerous module connections.

moving seals are required which must have long term sealing properties, the system must be ultra clean to prevent seal damage or cylinder scoring, there is no direct confirmation of the operation unless electrical travel sensors are installed.

Present sub-sea oil and gas production is limited by these methods of valve operation and control, particularly as regards the distance which the production can be from the operating installation. Costly platforms or floating installations are therefore required even in deep water locations.

Some functions of sub-sea oil and gas production, particularly in running and retrieving modules, cannot readily be operated other than by hydraulics, e.g. module connectors and soft landing jacks. However there would be advantages in operating all production functions electrically, particularly in operating oil valves (including chokes) electrically.

Electrical systems can be built to very high standards of reliability. A high power supply can be run to the sub-sea installation using a compact armoured steel cable with either electrical or fibre optics signal and feedback communication lines.

Due to quick response, all the power can be supplied by the cable (with no hydraulic storage requirements required). This is especially important when controlling a large number of operations e.g. when controlling a sub-sea production installation start up that includes separation and pumping. (See UK Patent Application No. 2202561).

SUMMARY OF THE INVENTION

Electrical system would allow the use of localised intelligent control systems and would be safe if cables were contained within hard-walled pressurised tubing pressurised to 100–200 p.s.i. above the hydrasphere with dielectric fluid. The use of electrical power gives other advantages in allowing the use of different power inputs e.g. a relatively low current for holding a valve and a higher current for actuation. DC electrical power would also allow drive to be reversed by simply reversing the voltage. Finally, electrics would also allow full instrumentation and control giving indications of:

pressure and temperature, accurate position and travel of axially moving parts, accurate indications of torque applied and rotation of rotatable parts.

From such data, the operating hysteresis could be monitored and recorded identifying the operating characteristics and every deviation from them due to e.g. wear or an increase in friction for any reason.

The use of electrical power rather than hydraulic power does, however, require an actuator that is reliable and able to open or close a valve and to hold it against a spring. The present invention is concerned with such an actuator.

According to the present invention a mechanical actuator for moving a shaft axially comprises:

a motor and a source of power for the motor, said motor driving, a gear assembly comprising a drive gear, a reaction gear and an operating gear, the drive gear, reaction gear and operating gear cooperating to give a mechanical advantage of at least 30:1 between the drive gear and operating gear, said operating gear engaging with an internally screw threaded sleeve engaging with an external screw thread on the shaft so that rotation of the sleeve moves the shaft axially relative to the sleeve, and a stop connected to the reaction gear preventing axial movement of the sleeve.

In its broadest form as set out above, therefore, the present invention is able to move a shaft of any convenient mechanism, particularly any gate valve or valve moved by axial movement of a shaft. It can thus be used for fail-as-is valves, chokes, and various locking mechanisms used in oil and gas production.

In a preferred embodiment it can be used to hold or to move a shaft axially against a force tending to move the shaft to a fail-safe position, for example the shafts of fail-safe closed or fail-safe open valves as used in oil or gas production. As previously explained, with such valves, the actuator has to hold the valve open (or closed) against the spring force, but also has to be capable of moving the valve to its operating position initially. The actuator may have to hold the valve open (or closed) for long periods, whereas moving the valve may only be required occasionally.

In this preferred embodiment, the stop preventing axial movement of the sleeve can be one or more locking dogs actuated by the reaction gear which is capable of movement relative to the drive gear, the moveable reaction gear and the operating gear acting as a differential.

BRIEF DESCRIPTION OF THE DRAWINGS

The invention is illustrated with reference to the accompanying drawings in which:

FIG. 1A is a section through a fail-safe closed valve with a valve actuator according to the present invention and FIGS. 1B and 1C are views of a gear assembly for the actuator.

DESCRIPTION OF THE PREFERRED EMBODIMENTS

Figure 1A:
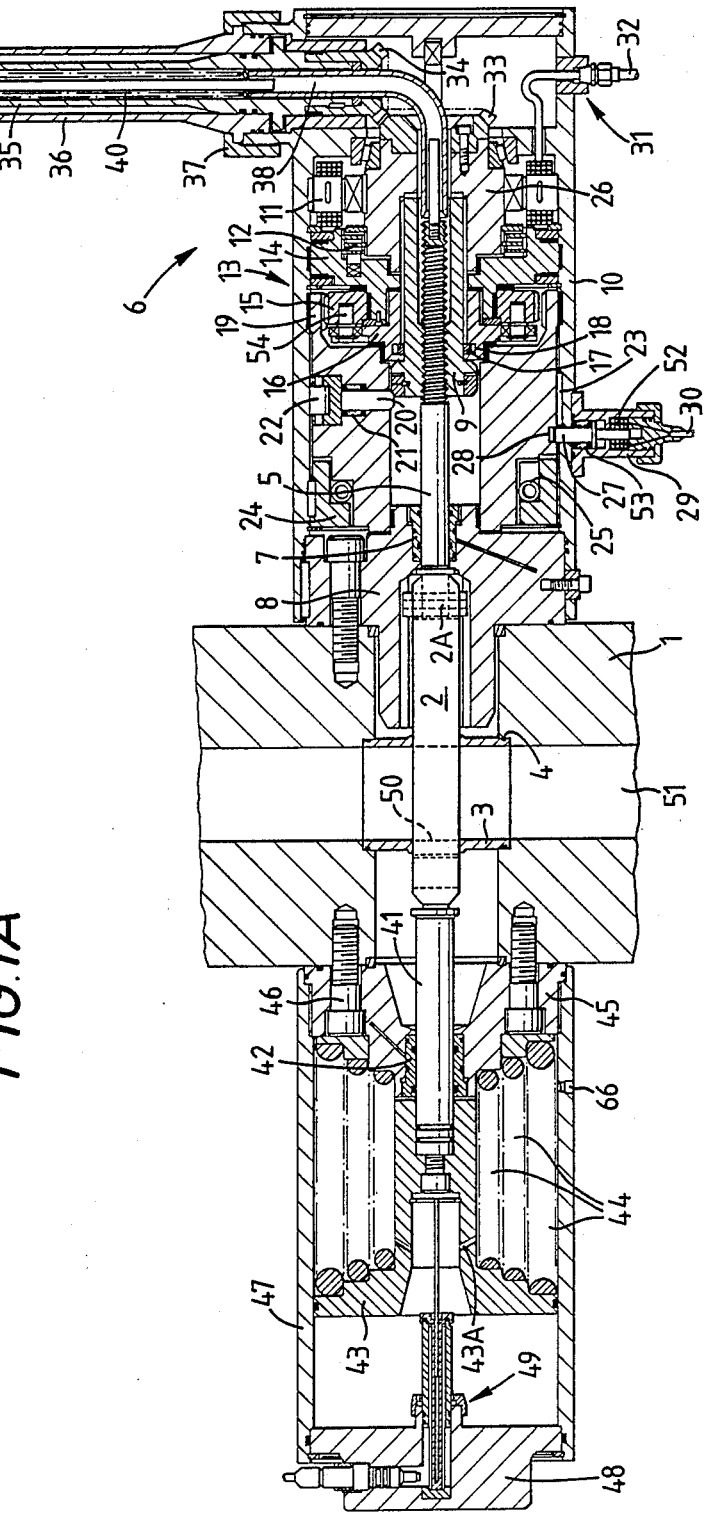

According to a preferred embodiment of the present invention a mechanical actuator for moving a shaft axially and for holding the shaft in a given position comprises:

a motor and a source of power for the motor, said motor driving, a gear assembly comprising a drive gear, a moveable reaction gear and an operating gear, said gears cooperating to give a mechanical advantage of at least 30:1 between the drive gear and operating gear, said operating gear engaging with, an internally screw threaded sleeve engaging with an external screw thread on the shaft so that rotation of the sleeve moves the shaft axially relative to the sleeve, said movable reaction gear being connected to one or more locking dogs, which, when actuated, prevent axial movement of the sleeve, said moveable reaction gear and operating gear acting as a differential so that torque applied to the drive wheel can be transferred either to the moveable reaction gear to actuate the locking dogs or to the operating gear to rotate the sleeve and move the shaft.

The motor is preferably an electric motor, given the previous comments on the advantages of electrical power for actuating valves in remote locations. Nevertheless the mechanical principles of the actuator are independent of the type of power and the type of motor and the actuator could if required be powered by hydraulic pressure and a hydraulic motor or, for non-subsea surface application, by compressed air and a compressed air motor. The motor may be an internal motor forming part of the actuator or an external motor.

The actuator could also be operated mechanically and, preferably, there is a mechanical override allowing the actuator to be operated mechanically, e.g. in a subsea location, by an ROV torque tool or by a well control module.

In the preferred embodiment of actuating a fail-safe closed or fail-safe open valve the actuator has to open and hold open a fail-safe closed valve (or close a fail-safe open valve) against the spring pressure and also against friction forces. In designing an actuator, regard should be given to these forces and also the well bore pressure and the hydrasphere. The valve should close (or open) in any situation, e.g. with a workover riser in place, a gas gradient to surface, and against the hydrasphere pressure and valve friction.

Given the relatively large forces involved, the gear assembly may have a considerable mechanical advantage, e.g. from 50–150:1 so that the power required is kept within reasonable limits. The lower the driving force, the higher the gearing ratio.

In a valve opening sequence, the locking dog (or a number of such dogs) is actuated first, by movement of the reaction gear, the operating gear wheel which moves the shaft being restrained by the spring force on the shaft. The reaction gear may rotate a locking dog ring through an arc of a circle to a stop position against a spring (other than the main valve spring), the locking dog being moved into place to act as a stop for the sleeve and hence the valve stem. With the locking dog in place it will be held in place provided power is maintained to hold the locking dog sleeve in its rotated position against the spring. Only a relatively small force is required to hold it in this way. A spring-release solenoid piston may be used to hold the sleeve in its locked position.

With the locking dog sleeve held against a stop, all the drive gear torque is now transmitted to the operating gear wheel. This will rotate the sleeve around the valve shaft to open the valve. As previously indicated, the sleeve surrounds the actuator valve stem and is internally screw threaded to engage with a corresponding screw thread on the valve stem. Rotation of the sleeve will thus move the stem axially (against the force of the main valve spring in the case of a fail-safe closed valve) to open the valve, and to adjust it to any desired position. A greater force will be required for this, which can be provided, in the case of electric power by increasing the current or, in the case of hydraulic or compressed air, by increasing the pressure. Once the valve has been opened to the required position, however, the opening force can be greatly reduced, the valve being held by the locking dogs. The opening force, can be discontinued if a solenoid is used, relatively small power supply to the spring release solenoid piston being the only power required. In the event of a power failure the solenoid piston will release the locking dog sleeve allowing it to return to its neutral position. This releases the dogs and allows the main valve spring to close the valve.

In the case of a fail-safe open valve, a similar sequence of operating the locking dog and then closing the valve will apply, with the valve being forced open in the event of power failure.

Fail-safe closed or fail-safe open valves using actuators of the present invention may have the normal features and constructions known for these valves. Thus the valve spring may be on a shaft at the other end of the valve gate to the actuator shaft, and the spring may be enclosed in a housing filled with a suitable damping fluid. Ports in the housing with spring loaded valves allow the damping fluid to vent gradually when the valve closes, thereby reducing the closing speed to an acceptable level. Linear Voltage Differential Transformer sensors can be fitted to give accurate travel position readings.

With a fail-as-is valve, a choke, or other mechanism which is not heavily spring loaded, a fixed stop is used to restrain the sleeve. Despite the absence of springs acting on the valve or other mechanism, there may still be considerable forces on the valve or other mechanism, e.g. friction, fluid flow forces, hydrasphere forces, so the use of a gear mechanism having a considerable mechanical advantage may still be beneficial and allow the valve or other mechanism to be moved or adjusted with a small power input.

FIG. 1A shows a typical fail-safe closed gate valve for use on a sub-sea oil production module. The valve itself and the fail-safe spring may be designed according to conventional practice and are shown here for the sake of completeness.

In FIG. 1A, a vertical bore 51 extends through a valve block 1. A horizontally moveable gate 2, sliding in a valve seat 3, can open or close the bore. Seals 4 ensure that the valve seat is fluid tight within the valve block 1. Valve actuator stem 5 extends on the right hand side of the valve to an electrically operated actuator indicated generally at 6. Valve stem 5 has its own seat 7 in housing 8 bolted to the valve block 1. A guide pin 2A is fitted to the right hand end of valve gate 2, running between guides in housing 8. This prevents valve stem 5 and gate 2 rotating. The end of valve stem 5 is externally screw threaded and is surrounded by an internally screw threaded sleeve 9. Rotation of sleeve 9 will thus more valve stem 5 and gate 2 relative to the sleeve in either axial direction depending on the direction of rotation. The actuator itself is contained within a housing 10. Its main components are a brushless 24V DC electric motor 11 driving, through gear wheel 26 and a slip clutch 12, an off-set internal drive gear assembly indicated generally at 13. The drive is through gear ring 14 to internal gear wheel 15.

Internal gear wheel 15 has external teeth meshing with internal teeth on reaction gear ring 19. The axis of wheel 15 is eccentric relative to the axis of gear 14 and to the axis of reaction gear ring 19, the teeth of internal gear wheel 15 making contact with the teeth of reaction gear 19 only over a limited arc. The mechanical advantage of the gear assembly is determined by the number of teeth on each gear and the degree of eccentricity. A gear ring 19 with 84 internal teeth meshing with a wheel 15 having 83 teeth will thus give a mechanical advantage of 83:1. Wheel 15 drives a torque drive gear 16. A number of pins 54 of wheel 15 extend into radial slots of torque drive gear 16, so that gear 16 rotates without having the eccentricity of wheel 15 transmitted to it. Torque drive gear 16 is splined to sleeve 9. There is also a spring ring 17 in groove 18 of gear 16. Reaction gear 19 extends beyond the gear assembly to form a locking dog ring. Reaction gear 19 can be rotated through an arc by internal gear 15. Reaction gear 19 will for the future description be referred to as locking dog ring 19. It actuates a number of locking dogs 20 which consist of a number of radial pins, spring loaded by springs 21, and which have rollers 22 which springs 21 tend to force into contact with outer housing 120. Housing 10 has a number of flutes 23 into which rollers 22 can be forced by springs 21 if locking dog ring 19 is in a position which bring rollers 22 into line with the flutes. This position is the neutral or release position, i.e. with the locking dog pins 20 retracted. Rotation of locking dog ring 19 will force the rollers 22 out of the flutes 23 and so move pins 20 radially inwards to the locking position. There may be any convenient number of pins, rollers and flutes, suitably four, in the housing. As shown in the drawings, the purpose of locking dogs 20 is to bear against the end of splined sleeve 9 and so prevent it moving to the left when the locking pins are down.

Locking dog ring 19 is only able to rotate through a small arc, its travel being limited by rotational limiter 24 which is fixed to housing 10. There are springs 25 between locking dog ring 19 and limiter 24, the rotation of ring 19 to move dogs 20 into the locked position acting to compress springs 25.

There is an additional locking pin 27 passing through housing 10 into hole 28 in the locking dog ring 19. Pin 27 is also lightly spring loaded by spring 53 and can be activated by a solenoid 52 enclosed in a housing 29 fixed to housing 10, and supplied with current by wires 30.

The current supply to motor 11 is fed in at 31 using a cable suitably protected and sheathed by a tube 32.

In addition to being driven by motor 11, gear 26 can be rotated mechanically. To allow for this, it has bevel gear teeth 33 at its end, meshing with another set of bevel gear teeth 34 at the end of a vertical shaft 35. Shaft 35 is surrounded by a fixed protection sleeve 36 held onto housing 10 by a cap 37. Shaft 35 is hollow, having within it a link 38 for a mechanical valve position indicator 39. Link 38 is attached to the end of valve stem 5 and the portion of it that turns through a right angle is made of a suitable flexible material (e.g. it may be a chain). Within shaft 35 and surrounding link 38 is a spring 40 so that link 38 is always under tension. The use of bevel gear teeth 33, 34 allow the horizontal valve shaft to be rotated from a vertical position. It will be appreciated that the shaft could also be rotated by a direct horizontal connection to gear 26.

On the other side of valve block 1 from actuator 6 is the valve spring mechanism acting to close the valve in the event of a power failure. Such fail-safe closed mechanisms are well known. A suitable mechanism is shown in FIG. 1A for purposes of illustration only. A valve spring stem 41 slides within a seating 42. Fixed to the end of stem 41 is a sleeve 43 having a circular end. A nest of springs 44 is positioned between the sleeve 43 and another fixed member 45 which is fixed to the valve block 1 by bolts 46. It will be seen that springs 44 bearing against the end of sleeve 43 tend to force the sleeve and hence the valve stem and valve gate to the left. The mechanism is enclosed within a sealed housing 47, the housing being filled with a suitable damping fluid. The housing has a damping fluid volume compensation port 66. Port 66 allows a controlled release of damping fluid from housing 47 when the valve closes, such a release being necessary because of the reduction in volume caused by stem 41 moving into sealed housing 47. A controlled release preventing too rapid movement of the valve is achieved by fluid in housing 47 having to pass through small ports 43A as sleeve 43 moves. End 48 of the housing has passageways for a valve position indicator shown generally at 49.

FIGS. 1B and 1C give more details of the gear assembly 13 of FIG. 1A using the same reference numerals as in FIG. 1A.

FIG. 1B is a view of the assembly, viewed from the left with respect to FIG. 1A, and FIG. 1C is a section along line A-A of FIG. 1B.

In FIG. 1B and 1C drive gear 14 of FIG. 1A is shown as a drive shaft 14, it being understood that any form of drive can be used. The centre line 68 of internal gear 15 is off-set relative to the centre line 69 of drive shaft 14 but the end of the drive shaft is also off-set at 70 so that it fits into a hole at the centre line of internal gear 15. The centre line of reaction gear 19 is the same as that of drive shaft 14. This relative eccentricity means that internal gear 15 only contacts reaction gear 19 at one point (i.e. at the top of FIG. 1C). Reaction gear 19 has 84 internal teeth and internal gear 15 has 83 external teeth. Offset end 70 of drive shaft 14 fits loosely into gear 15 so that as drive shaft 14 rotates the point of contact between eccentric internal gear 15 and reaction gear 19 moves round. If reaction gear is held still, then, after one rotation of drive shaft 14 the point of contact is back at the top, but since the gear teeth ratio is 84:83 the net effect is that the internal gear 15 has moved only 1 tooth in a direction of rotation opposite to that of drive shaft 14. Thus it will require 83 turns of drive shaft 14 to rotate gear wheel 15 once.

Pins 54 extending from internal gear 15 (shown in FIGS. 1B and 1C as fitted with rollers) fit into slots 67 of torque drive gear 16, which has the same centre line as drive shaft 14 and reaction gear 19. Pins 54 will thus move up and down in slots 67 but will nevertheless rotate drive gear 16 at the same speed of rotation as internal gear 15.

Reaction gear 19 and torque drive gear 16 can be used to act as two gears of a differential. The torque transmitted by internal gear 15 will drive one or the other or be split depending on the strength of the reaction forces acting on gears 16 and 19. If gear 16 is held then all the torque will go to gear 19: if gear 19 is held then all the torque will go to gear 16.

As has been explained with reference to FIG. 1A, reaction gear 19 forms a locking dog ring and has a limited freedom to rotate, while torque drive gear rotates sleeve 9 and hence moves valve stem 5. Slots 67 in torque drive gear are wider than pins 54, to allow limited movement of torque drive gear 16 relative to internal gear 15. This is required to allow reaction gear 19 to move through its arc when the system has to release the locking dogs 20.

The assembly shown in FIGS. 1B and 1C is merely illustrative and other forms of differential giving a high mechanical advantage may be used, for example, a flexible transmission such as that produced by Harmoc Drive Ltd. Reaction gear 19 remains a circular gear with internal splines, but eccentric internal gear 15 becomes a flexible externally splined band having an elliptical shape and touching reaction gear 19 at two points. A wave generator within the flexible splined band driven by a motor moves the zones of engagement of the flexible band around the reaction gear in the same way as for an eccentric gear wheel and by having a small difference (e.g two) between the number of splines on the reaction gear and the flexible band, the band will precess around the reaction gear. Thus a circular gear with 202 splines and a flexible band with 200 splines will give relative rotation and hence a mechanical advantage of 100:1.

The flexible band may drive a torque drive gear 16 or alternatively, the wave generator may drive a second flexible band fixed to the torque drive gear.

This differential action allows reaction 19 and torque drive gear 16 to be rotated in sequence, as will be apparent from the following description of the operation of the valve and actuator of FIG. 1A.

FIG. 1A shows the valve in its open position with hole 50 (indicated by dotted lines) through valve gate 2 in line with the bore 51 of valve block 1. Although springs 44 are acting to try to move gate 2 to the left and close the valve, movement is prevented by locking dog pins 20 bearing against the end of sleeve 9. Solenoid pin 27 is also shown in hole 28 of locking dog ring 19 preventing ring 19 from rotating. Provided there is a power supply to motor 11 to keep locking dog ring 19 rotated through the arc that keeps locking dog pins 20 in their locked position then sleeve 9 cannot move to the left and holds the valve stem and valve gate in the open position. Alternatively, a power supply to the solenoid 52 will keep solenoid pin 27 in the locked position, holding locking dog ring 19 in the rotated position that keeps locking dog pins 20 locked. It will be appreciated that the power supply can be either to the solenoid 52 (which is preferred) or the motor 11 or both.

Despite the strength of springs 44 only relatively low power is required to hold the solenoid pin 27 and so long as this power is maintained the valve will stay open.

In the event of a power failure or a deliberate shut-off of power, however, solenoid pin 27 will retract under the force of spring 53 and locking dog ring 19 will rotate through its permitted arc under the force of springs 25 to free locking dog pins 20. Free back movement is allowed by the slots 67 of torque drive gear 16 being wider than the pins 54 of internal gear 15. With the restraint on sleeve 9 now freed, valve spring 44 will rapidly move the valve stem and valve gate to the left closing the valve. The damping fluid and ports 43A in sleeve 43 control the speed of closing, excess damping fluid being vented through port 66. Sleeve 9 being screw threaded to stem 5 will also move, the force of valve spring 44 easily overcoming the force of spring ring 17 in groove 18 tending to hold sleeve 9 into engagement with gear 16.

To restore the valve to its open position, sleeve 9 has to be rotated relative to valve stem 5 to move it back to the right, while springs 44 still hold the valve closed. Motor 11 being a DC motor, is reversible, so sleeve 9 can be rotated by motor 11 through gear 26, clutch 12 and gear mechanism 13.

As previously explained, gear mechanism 13 acts as a differential being capable of rotating locking dog ring 19 or torque drive gear 16. However with the motor rotating in the reverse direction, locking dog ring 19 cannot move. However, the torque applied to locking dog ring 19 ensures that it remains in position with locking dog pins 20 in their withdrawn position. The main torque therefore goes to torque drive gear 16 acting on sleeve 9 through the matching splines of the gear and sleeve. Sleeve 9 will thus move to the right along the screw threads of valve stem 5 until it is back in the position shown in FIG. 1, the valve and valve stem still being held to the left. Spring ring 17 which will have moved out of groove 18 when the valve closed will move back into groove 18.

To open the valve, the direction of rotation of the DC motor is reversed. (This division can be called the valve opening direction, as distinct from the the other direction which is used only for resetting the actuator after a valve closure). Spring ring 17 in groove 18 will hold sleeve 9 and torque drive gear 16 together, so no torque will be transmitted to drive gear 16. Instead the torque will be transmitted to reaction gear 19 so that the first action of rotation in the valve opening direction is to rotate locking dog ring 19 through its permitted arc to move locking dog pins 20 down to their locked position. Solenoid pin 27 is free to move into hole 28 of locking dog ring 19 through the action of the solenoid 52, which is part of the electrical circuit in parallel with the motor.

With locking pins down, sleeve 9 is held against movement to the left. Torque is now transferred to torque drive gear 16. Since sleeve 9 cannot move to the left, the effect is to pull valve stem 5 to the right along the screw threads until the valve has reached the position shown in FIG. 1A and the valve is fully open again.

The torque required to open the valve against springs 44 will be considerable. However, gear mechanism 13 besides acting as a differential also has a considerable mechanical advantage. Thus, while a high torque is required to be applied through gear 16, the power required to drive internal gear 15 can be relatively modest, a brushless 24V DC motor being adequate for the duty.

When the valve is fully open, the power can be dropped to that required to hold solenoid 52 in its locked position and keep locking dog pins 20 locked.

FIG. 1A shows a fail-safe closed valve with an actuator powered by an internal electric motor, and with a mechanical override. It will be appreciated that there can be variations in the power supply without effecting the principle of operation of the actuator.

Figure 2A:
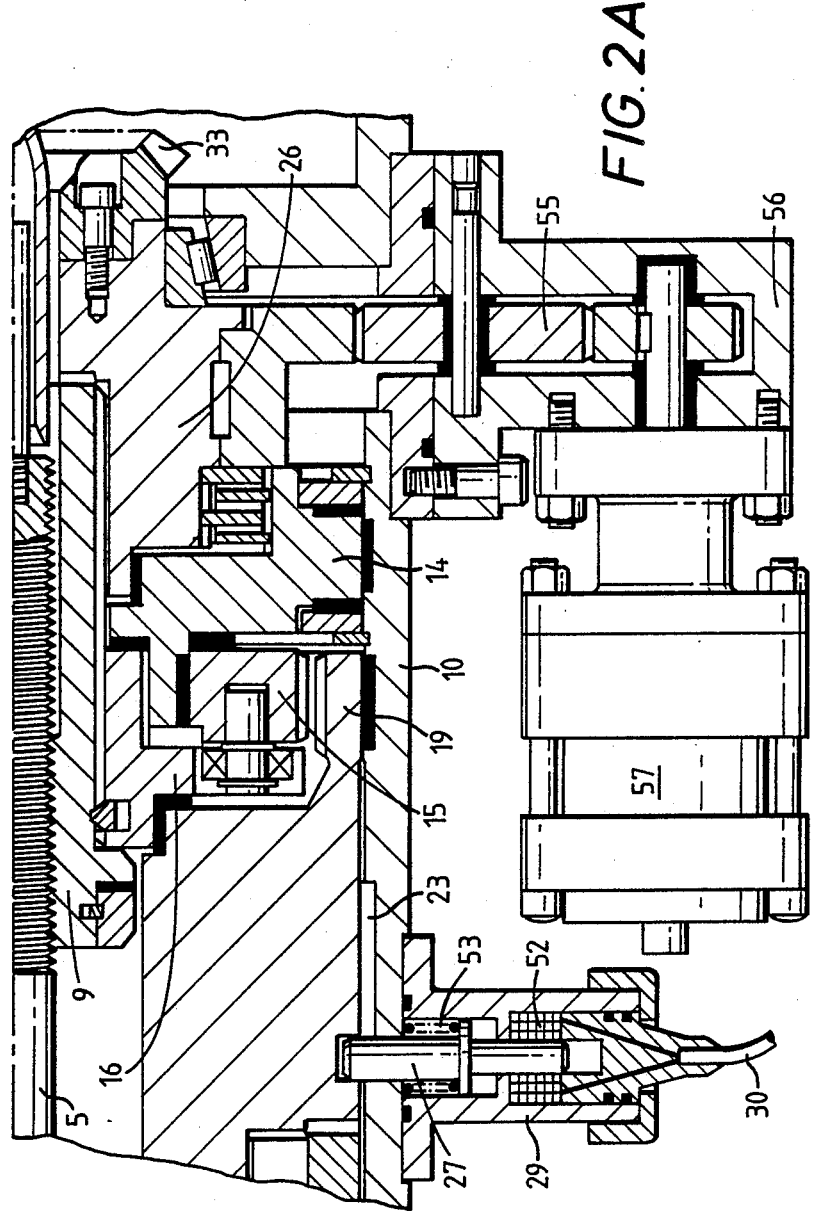
FIGS. 2A and 2B show an actuator similar to that of FIG. 1A but with different power supply system.
Figure 2B:
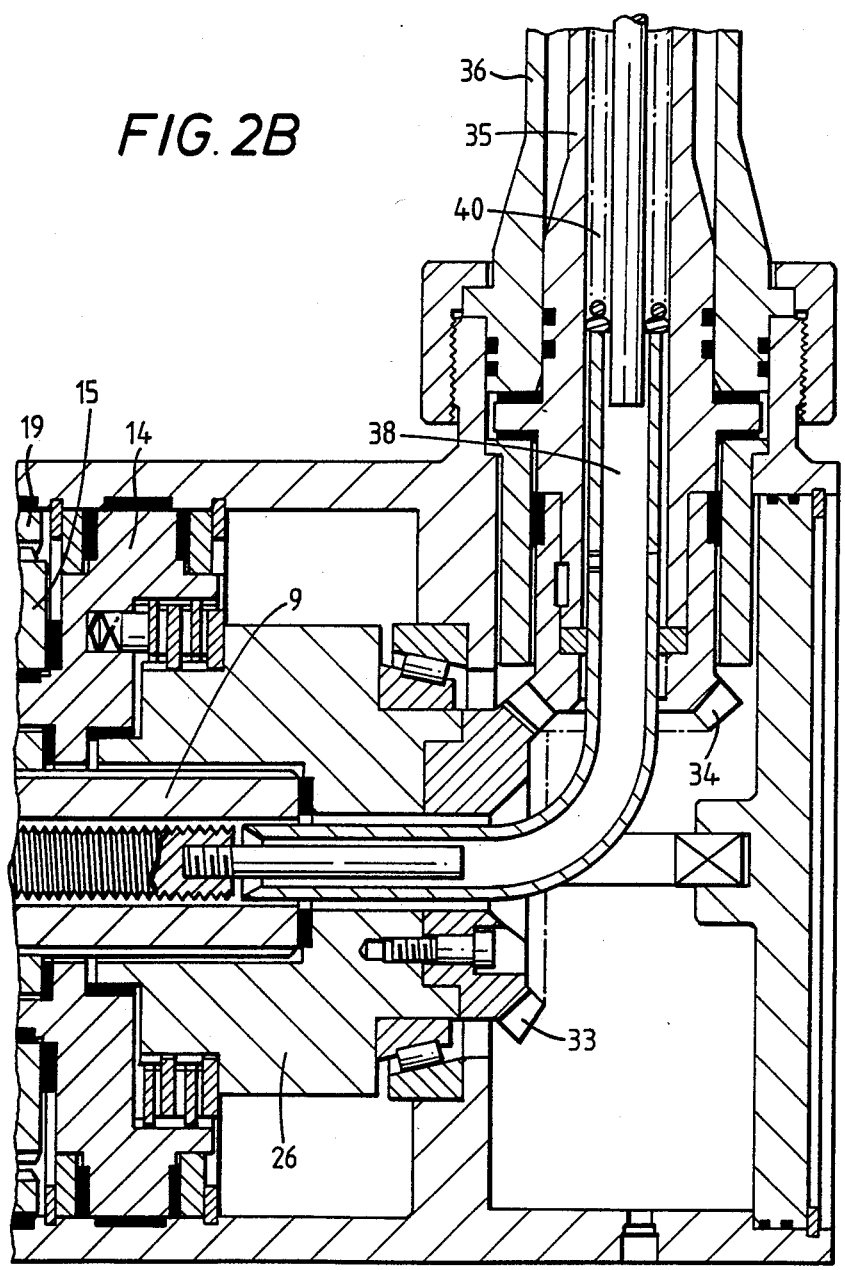

FIG. 2A shows an actuator similar to FIG. 1A but with an external electric motor 57 driving gear 26 through intermediate gearing 55 set in a housing 56. FIG. 2B shows an actuator end view similar to FIG. 1A but without any electric power. The actuator is operated mechanically through bevel gearing 33, 34 and shaft 35, in exactly the same way that the electrically powered actuator of FIG. 1A is mechanically overidden. It will be appreciated that there must be an ultimate power source to rotate shaft 35, but it can be a remote source and, possible, a mobile source, e.g. that provided by an ROV. Such a purely mechanical actuator could be part of a tree module of a sub-sea well with the shaft 35 extending up to the top of the tree to be accessible to a control module or a ROV.

Figure 2C:
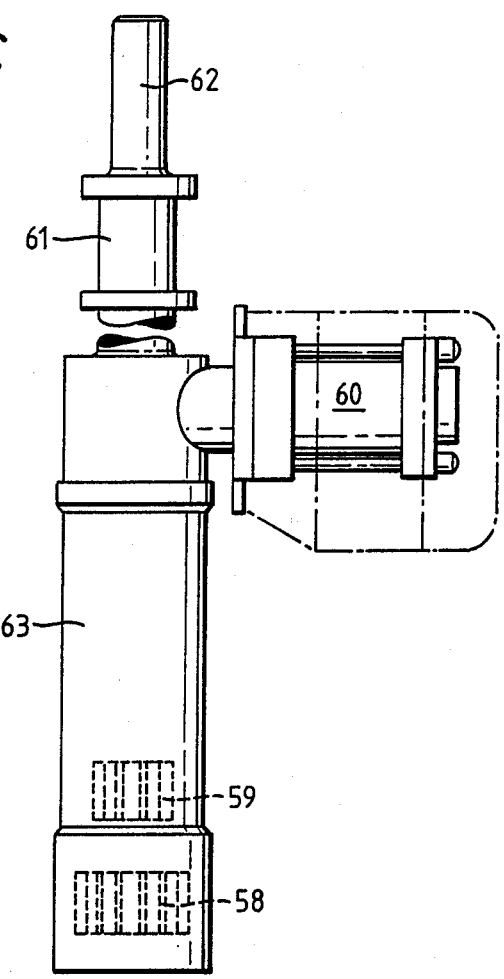
FIG. 2C shows a tool suitable for operating the actuator of FIG. 2B. invention having a fixed stop and suitable for use with a fail-as-is valve, a choke or other mechanism.

FIG. 2C shows a simple tool which could be used to rotate shaft 35. It consists of a hollow sleeve 63 having internal reaction splines 58 capable of mating with corresponding splines on the end of protection sleeve 36 (see FIG. 1A). Within sleeve 63 is another rotatable sleeve (not shown) having drive splines 59 capable of mating with corresponding splines at the end of shaft 35 (FIG. 1A). The rotatable sleeve can be powered by a DC electric motor 60. A hydraulic motor could be used instead of electric motor 60 if desired. The tool has a handle 61 so that it can be grasped by an ROV and there may be a travel indicator 62 at the top, which can be viewed by the ROW to indicate the travel of the rotatable sleeve and hence the position of the valve. FIG. 2C only gives a general description of a suitable tool which can be a known tool. A detailed description of a suitable tool can be found in UK Patent Application No. 2206146 with particular reference to FIG. 1 of that application.

FIG. 1A shows a fail-safe closed valve. It will be appreciated that the valve and actuator of FIG. 1A could be readily adapted to form a fail-safe open valve. All that would be required would be to move the position of the hole through the valve gate.

Figure 3:
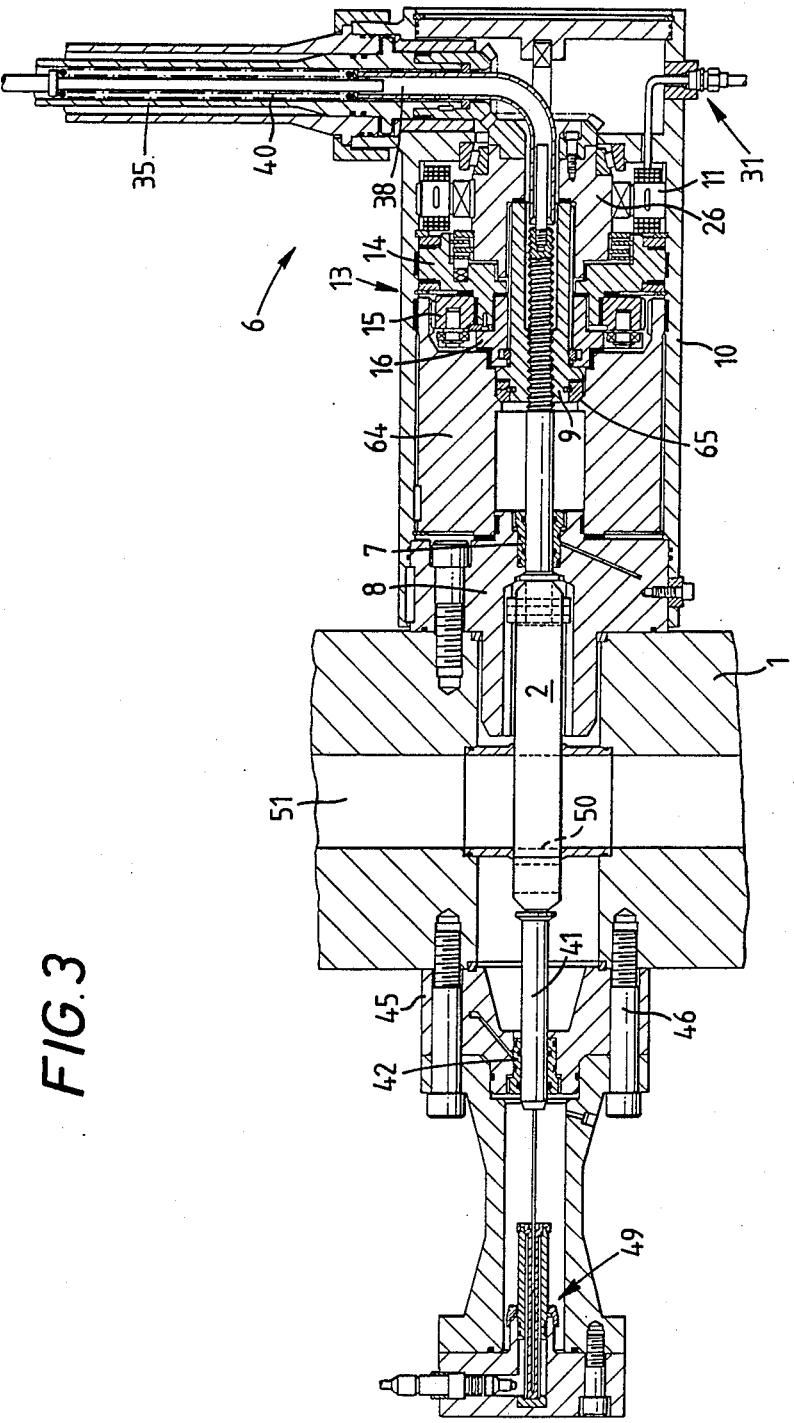

FIG. 3 shows the actuator and valve of FIG. 1 modified for a fail-as-is valve. At the right hand end there is no valve spring or housing. There is simply a seat 42 for valve steam 41, seat 42 being held in a housing 45 bolted by bolts 46 to valve block1. An extension to housing 45 is used to enclose the valve position indicator 49.

In the actuator 6 itself the mechanism (including electric motor and mechanical override) for rotating sleeve 9 is identical with that of FIG. 1A, giving the same mechanical advantage as in FIG. 1A. The difference lies solely in the fact that there is now no need for movable locking dog pins and a rotatable locking dog ring 19. The moveable locking dog ring 19 of FIG. 1A becomes fixed reaction gear 64 with a shoulder 65 acting as the stop to prevent axial movement of sleeve 9 to the left. Axial movement of sleeve 9 to the right is prevented by abutment of the sleeve against gear 26.

The simplified actuator of FIG. 3 can be used with any fail-as-is valve, or choke or other mechanism that does not have a fail-safe spring mechanism. Despite the absence of fail-safe springs it may still be necessary to apply considerably torque and the mechanical advantage provided by the gear mechanism allows the torque to be applied with a low power input.

Electric power is preferred for the reasons given in the preamble, but the actuators of FIGS. 1A and 3 could be adapted for actuation by hydraulic fluid or compressed air by substituting a reversible hydraulic motor reversible compressed air motor, for the electric motor. For the actuator of FIG. 1A the different power levels required to hold the locking pins 20 and to rotate the sleeve 9 could be effected by varying the hydraulic fluid or air pressures. The electric solenoid for locking pin 27 could be replaced by a hydraulic or a compressed air cylinder.

The invention claimed is:

1. A mechanical actuator for moving a shaft axially comprising:
    a motor and a source of power for the motor, said motor driving,
    a gear assembly comprising a drive gear, a reaction gear and an operating gear, the drive gear, reaction gear and operating gear cooperating to give a mechanical advantage of at least 30:1 between the drive gear and operating gear, said operating gear engaging with
    an internally screw threaded sleeve engaging with an external screw thread on the shaft so that rotation of the sleeve moves the shaft axially relative to the sleeve, and,
    a stop connected to the reaction gear preventing axial movement of the sleeve.

2. A mechanical actuator for moving a shaft axially as claimed in claim 1:
    wherein the reaction gear for the gear assembly is a movable reaction gear and the stop connected to the reaction gear is at least one locking dog which when activated prevents axial movement of the sleeve, said moveable reaction gear and operating gear acting as a differential so that torque applied to the drive wheel can be transferred either to the moveable reaction gear to actuate the locking dogs or to the operating gear to rotate the sleeve and move the shaft.

3. A mechanical actuator as claimed in claim 1 wherein the motor is an electric motor.

4. A mechanical actuator as claimed in claim 1 having a mechanical link to drive the gear assembly by a remote power source, as the sole motive power or as a mechanical override from another direct power source.

5. A mechanical actuator as claimed in claim 1 wherein the shaft to be moved is the shaft of a fail-as-is valve or a choke.

6. A mechanical actuator as claimed in claim 2 wherein the shaft to be moved is the shaft of a fail-safe closed or fail-safe open valve.

7. A mechanical actuator as claimed in claim 1 wherein the mechanical advantage is from 50 to 150:1.

8. A mechanical actuator as claimed in claim 2 wherein the reaction gear rotates through an arc of a circle to actuate the locking dogs.

9. A mechanical actuator as claimed in claim 8 wherein there is a second locking dog to hold the reaction gear in the actuating position.

10. A mechanical actuator as claimed in claim 1 wherein the gear assembly giving the mechanical advantage comprises an outer reaction gear ring with internal teeth meshing with an eccentrically mounted internal drive gear wheel with external teeth, and an operating gear driven by the internal drive gear wheel.

* * * * *